(12) United States Patent
Chang et al.

(10) Patent No.: US 8,770,805 B2
(45) Date of Patent: Jul. 8, 2014

(54) BACKLIGHT MODULE FOR LIQUID CRYSTAL DISPLAY AND LIQUID CRYSTAL DISPLAY

(75) Inventors: Kuang-yao Chang, Shenzhen (CN); Jianfa Huang, Shenzhen (CN); Chechang Hu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 172 days.

(21) Appl. No.: 13/380,871

(22) PCT Filed: Dec. 3, 2011

(86) PCT No.: PCT/CN2011/083417
§ 371 (c)(1), (2), (4) Date: Dec. 26, 2011

(87) PCT Pub. No.: WO2013/010365
PCT Pub. Date: Jan. 24, 2013

(65) Prior Publication Data
US 2013/0294052 A1    Nov. 7, 2013

(30) Foreign Application Priority Data

Jul. 18, 2011   (CN) ...................... 2011 2 0253363 U

(51) Int. Cl.
*G02F 1/1335* (2006.01)
(52) U.S. Cl.
CPC ............. *G02F 1/133603* (2013.01); *G02F 2001/133628* (2013.01); *G02B 6/0073* (2013.01); *G02B 6/0085* (2013.01); *G02F 1/133615* (2013.01)
USPC ............................. 362/373; 362/612; 349/58

(58) Field of Classification Search
USPC ............ 362/612, 294, 264, 373; 349/58, 161
See application file for complete search history.

(56) References Cited

U.S. PATENT DOCUMENTS

2008/0018825 A1\*   1/2008   Lee et al. ........................ 349/58
2008/0285290 A1\*  11/2008   Ohashi et al. ................. 362/373

(Continued)

FOREIGN PATENT DOCUMENTS

CN            1612022 A      5/2005
CN           201069134 Y     6/2008

(Continued)

OTHER PUBLICATIONS

Li Jiantao, the International Searching Authority written comments, Apr. 2012, CN.

*Primary Examiner* — Donald Raleigh
(74) *Attorney, Agent, or Firm* — IPro, Inc.; Na Xu

(57) ABSTRACT

The utility model discloses a backlight module for a liquid crystal display device and a liquid crystal display device. The backlight module comprises an LED and a backplane, wherein the backlight module also comprises a heatsink plate arranged on the outer of the backplane; and the LED is linked with the heatsink plate in the mode of heat conduction. The utility model, by arranging the LED on an extra heatsink plate which is arranged on the outer of the backplane, dissipates outward the heat emitted by the LED through the heatsink plate, lowers the temperature of the backlight cavity, and protects the optical components. At the same time, because the backplane is not directly used to dissipate heat, the gradient of temperature distribution on the backplane is reduced, thus, the gradient of temperature distribution in the backlight cavity is reduced and stress of the backlight cavity induced by the temperature gradient is also reduced.

12 Claims, 3 Drawing Sheets

(56) References Cited

U.S. PATENT DOCUMENTS

2010/0066937 A1* 3/2010 Yamashita et al. ............... 349/58
2010/0085502 A1* 4/2010 Yen et al. ......................... 349/58
2011/0043721 A1* 2/2011 Hwang et al. .................... 349/58
2011/0199788 A1* 8/2011 Park ................................ 362/612

FOREIGN PATENT DOCUMENTS

| CN | 101308269 A | 11/2008 |
| CN | 202074348 U | 12/2011 |

* cited by examiner

BACKLIGHT MODULE FOR LIQUID CRYSTAL DISPLAY AND LIQUID CRYSTAL DISPLAY

TECHNICAL FIELD

The utility model relates to the field of the liquid crystal display panel, and more particularly to a backlight module for a liquid crystal display device and a liquid crystal display device using the backlight module.

BACKGROUND

A backlight module is one of the crucial components of a liquid crystal display device. Because a liquid crystal display panel can not emit light, the function of the backlight module is to provide a light source of enough luminance and uniform distribution for the liquid crystal display device, so that the liquid crystal display device displays the image normally.

As shown in FIG. 1, in the current LED backlight, a PCB board 2 for installing a LED 3 is directly mounted on a backplane 5. The heat emitted by the LED 3 is dissipated into the air through the backplane 5; at the same time, because the backplane 5 directly contacts with some optical components, such as a light guide plate 4, etc, the quite number of heat is conducted to the inner of a backlight cavity. When the optical components are placed in a high-temperature field over a long period, the optical components will have many problems, such as aging, as well as stress, bending and accuracy control of tolerance caused by the thermal expansion and cold contraction, etc.

SUMMARY

One aim of the utility model is to provide a backlight module for a liquid crystal display device to lower the temperature of a backlight cavity and reduce the gradient of temperature distribution therein, as well as a liquid crystal display using the backlight module.

The aim of the backlight module for the liquid crystal display device of the utility model is achieved by the following technical schemes. A backlight module for a liquid crystal display device comprises an LED and a backplane, wherein the backlight module also comprises a heatsink plate arranged on the outer of the backplane; and the LED is linked with the heatsink plate in a mode of heat conduction.

The aim of the liquid crystal display device of the utility model is achieved by the following technical schemes. A liquid crystal display comprises a backlight module for a liquid crystal display device which comprises an LED and a backplane, wherein the backlight module also comprises a heatsink plate arranged on the outer of the backplane; and the LED is linked with the heatsink plate in the mode of heat conduction.

Preferably, an isolating layer is arranged between the heatsink plate and the backplane. The isolating layer increases the thermal resistance between the heatsink plate and the backplane, and reduces the heat of the heatsink plate conducted to the backplane.

Preferably, the isolating layer is an air layer. The isolating layer has poor heat conductivity of air, so the heat is effectively prevented from conducting to the backplane.

Preferably, the isolating layer is of the heat-insulating material arranged between the heatsink plate and the backplane.

The heat-insulating material is of the material with poor thermal conductivity and the coefficient of thermal conductivity of less than 1 W/mK. The heat-insulating material with poor thermal conductivity can preferably prevent the heat from being conducted to the backplane.

Preferably, the thickness of the air layer is from 0.5 mm to 4 mm. If the thickness of the air layer is little, the effect of heat resistance is not good enough; if the thickness of the air layer is large, the space used is oversize. Thus, the preferred thickness range in the utility model is from 0.5 mm to 4 mm.

Preferably, the heat-insulating material is of a foamed plastic which is a heat-insulating material with preferred effect and low cost.

Preferably, the backlight module also comprises a conduction plate for fixing the LED, and the LED is linked with the heatsink plate in the mode of heat conduction through the conduction plate. Wherein, the conduction plate and the heatsink plate are formed by bending one plate; the conduction plate is perpendicular to the backplane; and the heatsink plate is parallel to the backplane. The conduction plate and the heatsink plate formed by bending one plate have a fine effect of heat conduction. The conduction plate is used to mount the PCB board. The heatsink plate is parallel to the backplane for dissipating the heat. And thus, the heatsink plate not only can obtain a greater area of dissipating heat, but also can reduce the space used.

Preferably, the backlight module comprises a PCB board, wherein the LED is directly arranged on the PCB circuit board, so that the LED is arranged on the heatsink plate through the PCB circuit board. The LED is arranged on the PCB circuit board, so that the heatsink plate can simultaneously dissipate the heat on the LED and the PCB board. Thus, the space used is further reduced and the effect of dissipating heat is good.

The utility model, by arranging the LED on the extra heatsink plate which is arranged on the outer of the backplane, dissipates outward the heat emitted by the LED through the heatsink plate, lowers the temperature of the backlight cavity, reduces the gradient of temperature distribution in the backlight cavity, reduces effectively the stress of the optical components in the backlight cavity induced by the temperature gradient, and reduces the effect of thermal expansion and cold contraction of each component.

Wherein: 1. heatsink plate; 10. conduction plate; 2. PCB board; 3. LED; 4. light guide plate; 5. backplane; 6. isolating layer.

DETAILED DESCRIPTION

The utility model will further be described in detail in accordance with the figures and the preferred examples.

Figure 1:
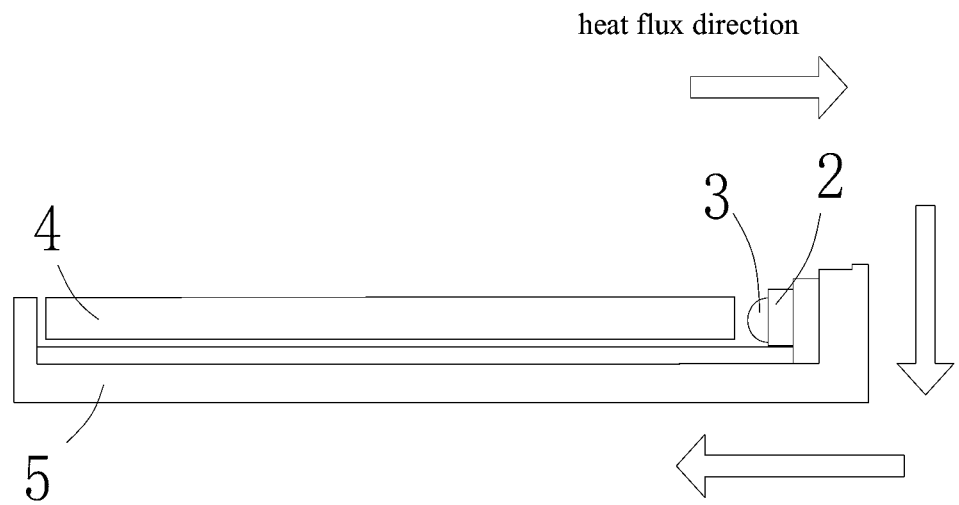
FIG. 1 is a sectional view of a backlight module of the prior art.
Figure 2:
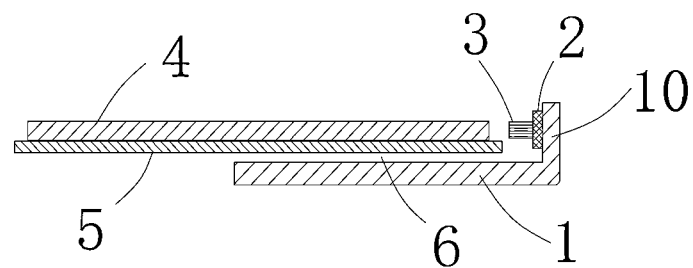
FIG. 2 is a sectional view of an example of the utility model.
Figure 3:
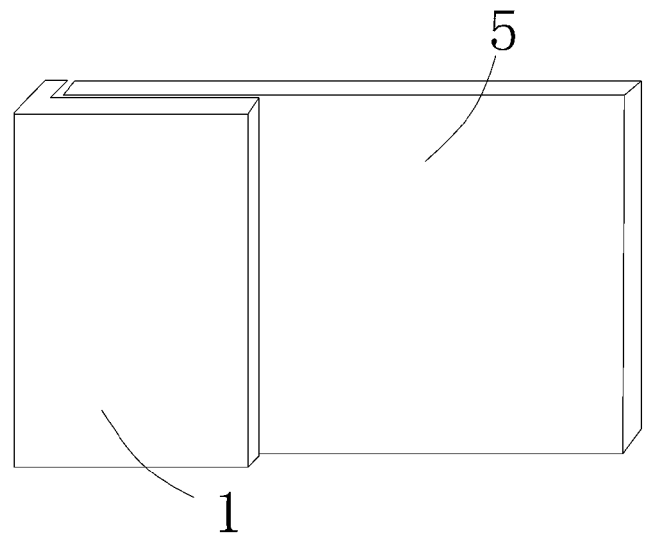
FIG. 3 is a structural diagram of an example of the utility model.

A backlight module for a liquid crystal display device comprises a light guide plate 4, a backplane 5, an LED 3, and a heatsink plate 1, wherein the heatsink plate 1 is arranged on the outer of the backplane 5; the LED 3 is linked with the heatsink plate 1 in the mode of heat conduction. As shown in FIG. 2 and FIG. 3, the LED 3 is fixed to the extra heatsink plate 1 which is arranged on the outer of the backplane 5 through the PCB board. 2

The backlight module also can comprise a conduction plate 10 for fixing the LED 3. Wherein, the LED 3 is linked with the heatsink plate 1 in the mode of heat conduction through the conduction plate 10; the conduction plate 10 and the heatsink plate 1 are formed by bending one plate; after bending, two mutually perpendicular parts are formed; the conduction plate 10 with a smaller area is perpendicular to the backplane 5 to be used for mounting the PCB board 2; the heatsink plate 1 is parallel to the backplane 5 to avoid the space used is oversize. The heatsink plate 1 has a larger area to enlarge the cooling surface thereon. Thus, the efficiency of dissipating heat can be further increased.

A certain distance is kept between the heatsink plate 1 and the backplane 5 to form an isolating layer 6, so that the heatsink plate 1 does not contact with the backplane 5 and both sides of the heatsink plate 1 contact with the air. This design facilitates dissipating the heat. Thus, the temperature of the LED 3 can be further lowered and the service life thereof can be prolonged. The heat-insulating materials that have poor thermal conductivity, that is, the coefficient of thermal conductivity of the heat-insulating materials is less than 1 W/mK, such as foamed plastic, rubber, etc., can be filled into the isolating layer 6 between the heatsink plate 1 and the backplane 5. Because the air and the heat-insulating material are poor conductors for the heat, the phenomenon that the heat emitted by the LED 3 is directly conducted to the backlight cavity through the backplane 5 is more effectively avoided. If there is no any heat-insulating material in the isolating layer 6, the air isolating layer is better to have a certain thickness, so that the air isolating layer can not occupy a large space, and also can achieve the valid effect of dissipating heat. The preferred thickness range of the air layer is from 0.5 mm to 4 mm. In this example, the thickness of the air layer is about 3 mm.

Figure 4:
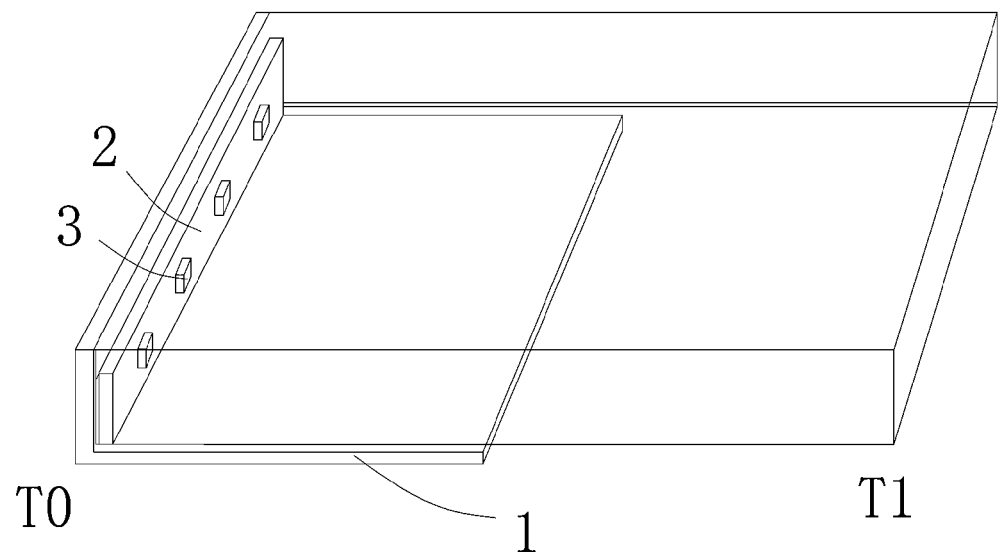
FIG. 4 is a schematic diagram of a cooler-backlight structure for filming of a thermal imager of an example of the utility model.
Figure 5:
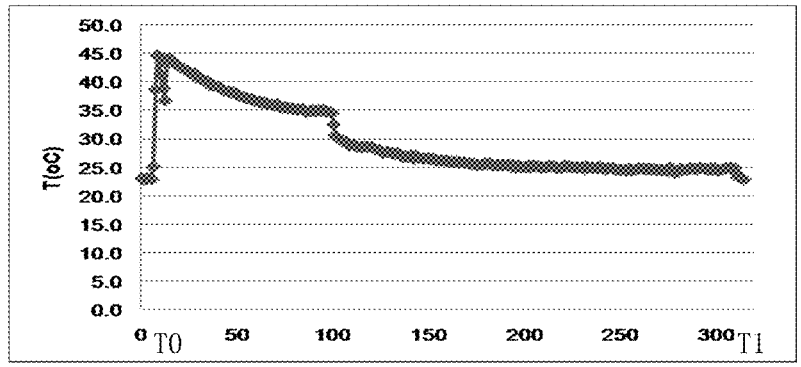
FIG. 5 is a view of temperature distribution of the cooler-backlight structure as shown in FIG. 4 filmed by the thermal imager from the back.
Figure 6:
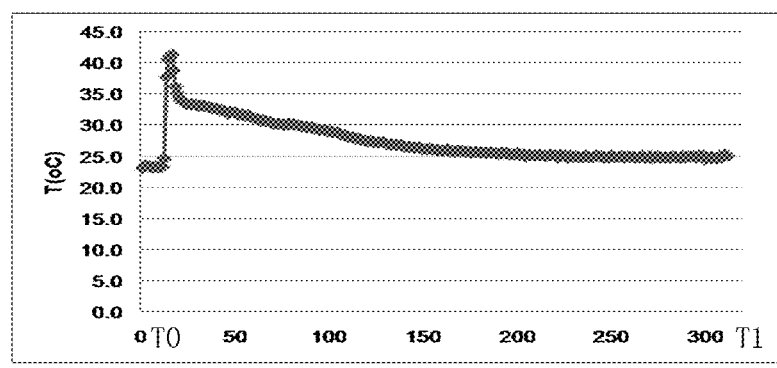
FIG. 6 is a view of temperature distribution of the cooler-backlight structure as shown in FIG. 4 filmed by the thermal imager from the front.

FIG. 5 is a view of temperature distribution of the cooler-backlight structure as shown in FIG. 4 filmed by the thermal imager from the back. It is observed that the parts with a high temperature mainly concentrate on the heatsink plate 1, and the temperature of the backplane 5 and the backlight cavity is relatively low and uniform. FIG. 6 is a view of temperature distribution of the cooler-backlight structure as shown in FIG. 4 filmed by the thermal imager from the front. It is observed that in addition to the temperature at the frame is slightly high, the temperature variation of the valid display region is more gentle, the temperature difference is within 10°, and the temperature is essentially the same as the room temperature (24°) during the experiment, so that, the effect of thermal expansion and cold contraction of the optical components, such as the light guide plate 4, can be reduced. Thus, the reserved space of thermal expansion is reduced and the gap between the LED 3 and the light guide plate 4 can be controlled more precisely.

It is observed that the aforementioned schemes can effectively lower the temperature in the backlight cavity, reduce the gradient of temperature distribution in the backlight cavity, effectively reduce the stress of the optical components of the backlight cavity induced by the temperature gradient, and reduce the effect of thermal expansion and cold contraction of each component. Besides, a specialized device for dissipating heat is arranged on the heatsink plate to enhance the heat-sinking capability, so that the temperature of the LED chip can be lowered effectively and the service life of the LED can be prolonged. Because the effect of dissipating heat is enhanced, the backlight module will use the LED with greater power.

The utility model is described in detail in accordance with the above contents with the specific preferred examples. However, this utility model is not limited to the specific embodiments. For example, the LED is not necessarily linked with the heatsink plate through the PCB board and the conduction plate. The LED can directly be arranged on the conduction plate, even directly on the heatsink plate, and only the LED meets its position requirements and connects electrically to the PCB board. For the ordinary technical personnel of the technical field of the utility model, on the premise of keeping the conception of the utility model, the technical personnel can also make simple deductions or replacements, and all of which should be considered to belong to the protection scope of the utility model.

The invention claimed is:

1. A backlight module for a liquid crystal display device, comprising: an LED, a light guide plate, and a backplane directly contacts with the light guide plate; said backlight module also comprises a heatsink plate arranged on the outside of the backplane; and said LED is linked with the heatsink plate in a mode of heat conduction; wherein an isolating layer is arranged between said heatsink plate and said backplane, and said isolating layer is an air layer, wherein the thickness range of said air layer is from 0.5 mm to 4 mm.

2. The backlight module for the liquid crystal display device of claim 1, wherein said isolating layer is of a heat-insulating material arranged between said heatsink plate and said backplane.

3. The backlight module for the liquid crystal display device of claim 2, wherein said heat-insulating material is of the material that the coefficient of thermal conductivity is less than 1 W/mK.

4. The backlight module for the liquid crystal display device of claim 2, wherein said heat-insulating material is of a foamed plastic.

5. The backlight module for the liquid crystal display device of claim 1, wherein said backlight module also comprises a conduction plate for fixing the LED; said LED is linked with the heatsink plate in the mode of heat conduction through the conduction plate; said conduction plate and said heatsink plate are formed by bending one plate; said conduction plate is perpendicular to the backplane; and said heatsink plate is parallel to the backplane.

6. The backlight module for the liquid crystal display device of claim 1, wherein said backlight module comprises a PCB circuit board; said LED is directly arranged on the PCB circuit board; and said LED is arranged on the heatsink plate through the PCB circuit board.

7. A liquid crystal display device, comprising: a backlight module, the backlight module comprises an LED, a light guide plate, and a backplane directly contacts with the light guide plate; said backlight module also comprises a heatsink plate arranged on the outside of the backplane; and said LED is linked with said heatsink plate in the mode of heat conduction; wherein an isolating layer is arranged between said heatsink plate and said backplane, and said isolating layer is an air layer, wherein the thickness range of said air layer is from 0.5 mm to 4 mm.

8. The liquid crystal display device of claim 7, wherein said isolating layer is of a heat-insulating material arranged between said heatsink plate and said backplane.

9. The liquid crystal display device of claim 8, wherein said heat-insulating material is of the material that the coefficient of thermal conductivity is less than 1 W/mK.

10. The liquid crystal display device of claim 8, wherein said heat-insulating material is of a foamed plastic.

11. The liquid crystal display device of claim 7, wherein said backlight module also comprises a conduction plate for fixing the LED; said LED is linked with the heatsink plate in the mode of heat conduction through the conduction plate; said conduction plate and said heatsink plate are formed by bending one plate; said conduction plate is perpendicular to the backplane; and said heatsink plate is parallel to the backplane.

12. The liquid crystal display device of claim 7, wherein said backlight module comprises a PCB circuit board; said LED is directly arranged on the PCB circuit board; and said LED is arranged on the heatsink plate through the PCB circuit board.

* * * * *